United States Patent

[11] 3,597,090

| [72] | Inventor | David H. Humphrey |
| | | G.P.O. Box 2226, San Juan, P.R. 00436 |
| [21] | Appl. No. | 777,790 |
| [22] | Filed | Nov. 21, 1968 |
| [45] | Patented | Aug. 3, 1971 |

[54] LEVELLING INSTRUMENT USING A REFLECTIVE PENDULUM
8 Claims, 10 Drawing Figs.

[52] U.S. Cl. ............................................. 356/149,
33/206.1, 33/215.1, 33/215.3, 356/250
[51] Int. Cl. ............................................. G01c 1/10,
G01c 9/12, G01c 9/16
[50] Field of Search .................................. 356/149,
184, 250; 33/206.1, 206.1 L, 215.1, 215.3

[56] References Cited
UNITED STATES PATENTS

| 2,020,238 | 11/1935 | Cantaluppi | 33/215.1 |
| 2,310,446 | 2/1943 | Langley | 356/149 X |
| 2,369,622 | 2/1945 | Toulon | 33/P.G. DIG. (UX) |
| 2,503,422 | 4/1950 | Silverman et al. | 33/215.1 |
| 2,503,423 | 4/1950 | Silverman et al. | 33/215.1 |
| 2,511,869 | 6/1950 | Null | 33/206.5 UX |
| 3,011,384 | 12/1961 | Biber | 356/250 |
| 3,097,565 | 7/1963 | Kupelian | 33/206.5 X |

*Primary Examiner*—Ronald L. Wibert
*Assistant Examiner*—Warren A. Sklar
*Attorney*—Molinare, Allegretti, Newitt and Witcoff ABSTRACT: A levelling instrument in which a level condition is indicated by the projection of light beams on a pair of projection screens, the beams being controlled by a pendulum having reflecting surfaces. The movements of the pendulum may be damped by enclosing the pendulum in a chamber filled with damping liquid, and friction on the pivot for the pendulum may be minimized by providing a pendulum having a specific gravity matching that of the liquid fill. Signal means may be provided in place of the projection screens.

Patented Aug. 3, 1971 3,597,090
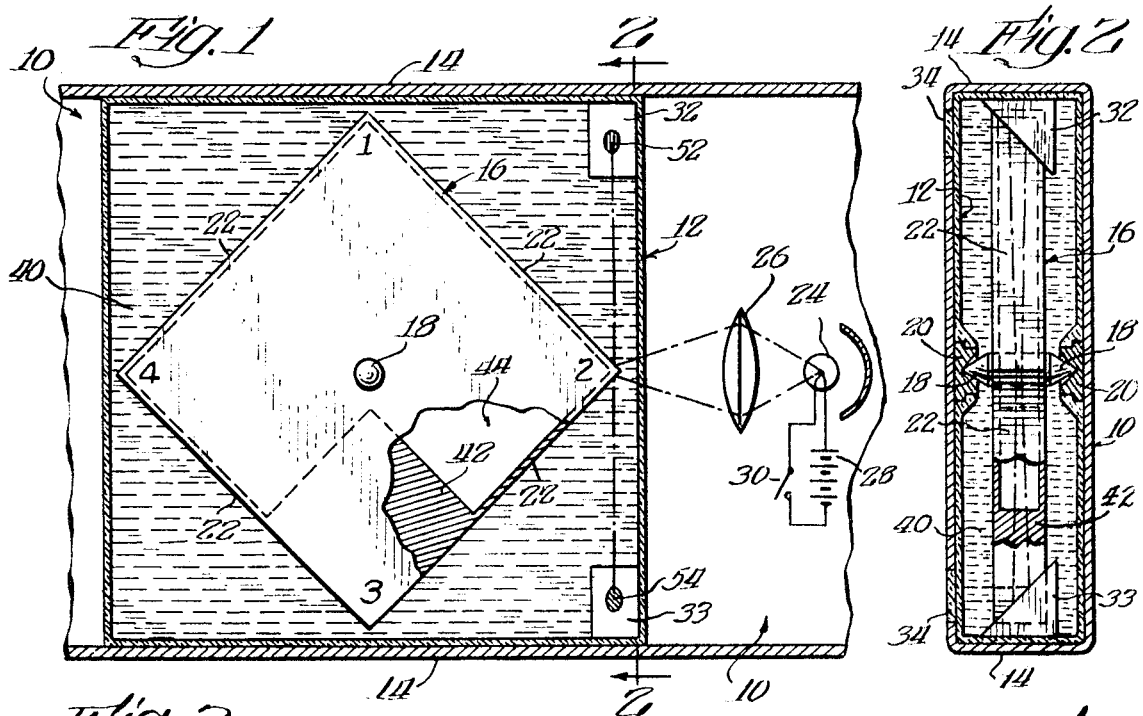
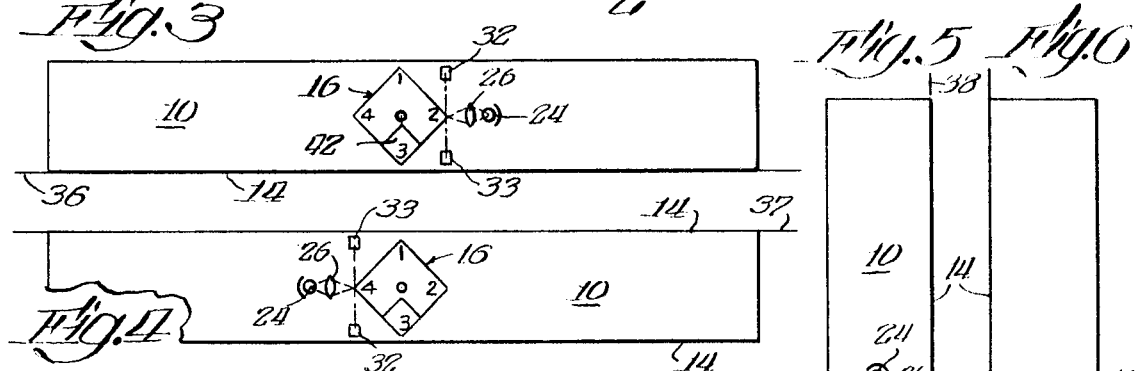
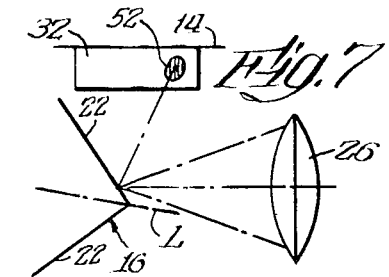
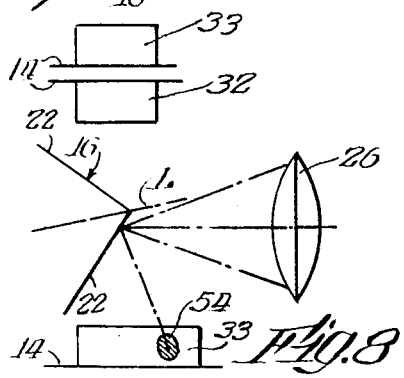
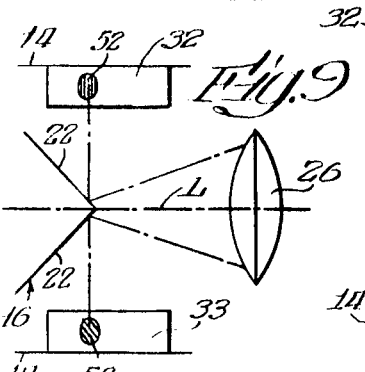
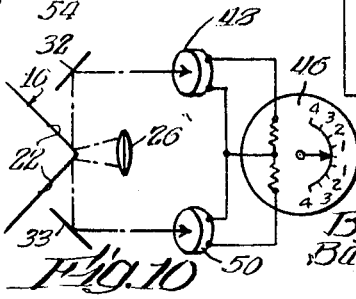
INVENTOR.
David H. Humphrey
By Bair, Freeman & Molinare
Attys.

LEVELLING INSTRUMENT USING A REFLECTIVE PENDULUM

BACKGROUND OF THE INVENTION

Heretofore most levelling instruments employed a visually read bubble. A bubble can be read from only a limited range of directions and from a limited distance. For maximum utility, bubble levels have a minimum of four level vials oriented 90° to each other. There are also levelling instruments of the weighted float type such as Pickett U.S. Pat. No. 2,939,221. The users of levelling instruments, however, sometimes have to work in conditions of poor light and often have to level surfaces which are difficult to reach or see properly, such as when levelling overhead members.

One object of my present invention is to provide a levelling instrument using a single pendulum and reflected light beams to indicate a level condition in each of four 90° angles of rotation, the light beams being reflected on, for instance, projection screens which are easy to observe from a wide variety of angles and from a considerable distance.

Another object is to provide a levelling instrument which is equally easy to use for both levelling and plumbing objects since the instrument might normally be picked up with either end up, or a given end to the right or left. It is therefore important that the instrument operate equally well when oriented either end up or down or to the right or to the left.

Still another object is to provide a levelling instrument wherein a pendulum which is a true square has a pivoting center equidistant from the four corners of the square with one of the four corners weighted and each of the four corners exactly at 90° from the two adjacent corners, the pendulum being supported by a center pivot shaft with needle point ends supported within cone indentations of pivot bearings to provide minimum friction and supported by a body member having a reference surface for the levelling instrument.

A further object is to provide a chamber within the body member for the pendulum, which chamber is filled with damping liquid to dampen the pendulum action for fast reading capability.

Still a further object is to provide a light source and reflecting system terminating in projection screens facing in a common direction on which the light beams are projected in accordance with reflections from a pair of reflector surfaces of the pendulum as it responds to gravity.

An additional object is to provide a pendulum which is a true square with its pivoting center exactly at the center of the square, and to balance the total weight of the pendulum unit with the buoyancy property of an air cavity so that the pendulum is literally free of gravity while suspended in the damping liquid, that is the buoyancy and gravity will exactly neutralize each other, thus minimizing friction and wear on the pivot bearings and result in readings of maximum accuracy.

Another additional object is to provide a battery powered electric bulb as a light source and a lens system for focusing the light sharply on the corner between two reflecting surfaces of a pendulum when it is in a level or plumb indicating position, thus equally illuminating two projection screens so that unequal illumination thereof or illumination of only one indicates a nonlevel or nonplumb position of the body member of the levelling instrument.

Still another additional object is to provide a modified embodiment of the invention in which signal means is actuated by the light beams instead of the beams falling on projection screens.

BRIEF SUMMARY OF THE INVENTION

A body member is provided having a chamber therein in which a pendulum is pivoted, the pendulum having a pair of reflecting surfaces for reflecting light beams to a pair of projection screens or to signal means to indicate level conditions. The chamber may be filled with damping liquid and the pendulum may have an air space balanced against the weight of the pendulum so that the specific gravity of the pendulum is the same as the damping liquid, thus eliminating pivot bearing friction by counteracting gravity acting on the pendulum. The pendulum is preferably a square so that each of its four corners presents a pair of reflecting surfaces whereby the levelling instrument can be used in any one of four positions with equal facility.

BRIEF DESCRIPTION OF THE DRAWINGS

FIG. 1 is a vertical, longitudinal sectional view through a levelling instrument embodying my invention, most of the pendulum being shown in side elevation;

FIG. 2 is a vertical sectional view on the line 2-2 of FIG. 1 and shows a portion of the pendulum broken away and another portion thereof in section;

FIGS. 3, 4, 5 and 6 are diagrammatic illustrations of my levelling instrument in four different possible positions;

FIGS. 7 and 8 are diagrams of the light beam system showing nonlevel conditions;

FIG. 9 is a similar diagram showing a level condition; and

FIG. 10 is a diagram showing signalling means instead of projection screens for reading my levelling instrument.

DESCRIPTION OF THE PREFERRED EMBODIMENTS

On the accompanying drawing I have used the reference numeral 10 to indicate a body member which may be of rectangular cross section as shown in FIG. 2 and of considerably greater length than shown in FIG. 1, the proportions thereof being represented in FIGS. 3, 4, 5 and 6, for instance. The body member 10 thus serves as an elongated beam for the levelling instrument having reference surfaces 14 to place against any member, the levelness or plumbness of which is to be determined. The body member 10 may be formed of extruded metal or plastic as found desirable.

Within the body member 10 a chamber 12 is provided which is formed of transparent plastic or the like so that light beams can be projected therethrough for a purpose which will hereinafter appear. A pendulum 16 is contained in the chamber 12 and has a pivot shaft 18 provided with needle point ends located in cone seats of pivot bearings 20 carried by the body member 10 as shown in FIG. 2. The pendulum 16 is preferably in the form of a square housing formed of metal or plastic as found suitable having four reflecting surfaces 22 at exactly 90° to each other and which provide four pairs of reflecting surfaces at the corners numbered 1, 2, 3 and 4. The pendulum 16 is formed with a weighted part 42 so that gravity acts thereon to retain the pendulum or move it always to the positions shown in FIGS. 1, 3, 4, 5 and 6 with the No. 1 corner uppermost as the weight 42 is adjacent the No. 3 corner.

A light source is provided in the form of a light bulb 24 powered as by a battery 28 controlled by a switch 30, the battery and switch being shown diagrammatically in FIG. 1 and contained in any convenient portion of the body member 10 in an obvious manner.

A suitable lens system is provided for concentrating and focusing the light from the bulb 24 sharply on the No. 2 corner as shown in FIGS. 1 and 3, a single lens 26 being shown merely be way of illustration. The reflecting surfaces 22 reflect the focused beam equally in opposite directions (up and down in FIGS. 1 and 3) to reflecting means 32 and 33 such as prisms or mirrors so that the resultant reflected beams can be projected in a common direction as onto projection screens 34 shown in FIG. 2. These may be "ground glass" or similar screens so that light images may be seen thereon, an arrangement obvious to those familiar with the optical art.

By providing a square pendulum 16, the body member 10 may be used with either end to the right or left as in FIGS. 3 and 4 or either end up or down as in FIGS. 5 and 6, yet in each instance the same operating principle will be involved except the light beam from the lens 26 will fall on a different one of the numbered corners as illustrated in these four FIGS. By having two (upper and lower) reference surfaces 14 as shown in FIG. 1, which of course are parallel to each other, the body member 10 may be placed on top of a horizontal surface 36 as shown in FIG. 3, up against a horizontal surface 37 as shown in FIG. 4 for levelling operations, or against vertical surfaces 38 or 39 as shown in FIGS. 5 and 6 for plumbing operations.

As to the operation of the light beam system, reference is made to FIG. 7 wherein the reference surfaces 14 are tipped downwardly to the left with respect to the reflecting surfaces 22 which would of course be level. The center line L indicates level orientation. Accordingly, the light beam impinges the reflector 32 as indicated at 52 but there is no image on the reflector 33. Conversely as in FIG. 8 when the reference surfaces are tipped downwardly toward the right, the reflection image appears at 54 on the reflector 33 but there is no image on the reflector 32.

In a level condition however, as illustrated in FIG. 9, the light beam from the lens 26 is reflected equally by the two surfaces 22 causing an image at 52 on the reflector 32 and an image at 54 on the reflector 33. These two images are also shown in FIG. 1, and FIG. 2 illustrates how they are reflected by the reflectors 32 and 33 to the ground surfaces of the projection screens 34. Accordingly, the user of the levelling instrument is able to quickly and accurately determine an out-of-level or out-of-plumb condition such as shown in FIGS. 7 or 8, or a level or plumb position as shown in FIG. 9.

Other means may be provided in place of the projection screens 34 such as a signalling device (milliammeter or the like) 46 shown in FIG. 10 wherein the light beams fall upon light responsive cells 48 and 50, such as photoelectric cells, so connected to the signal means 46 as to indicate a null position for the indicating needle when the two reflected light beams are equal, or a positive reading in either direction when they are not equal or when one is illuminated to the exclusion of the other. In place of the milliammeter 46 an audible signal or other type of signal means may be provided in an obvious manner.

In FIGS. 7, 8 and 9 the images 52 and 54 are lined for the colors red and green respectively. This may be used as a means to further distinguish in the readings of my levelling instrument. The adjacent surfaces 22 being tinted the two different colors, or the reflecting surfaces 32 and 33 may be tinted, the readings thereby being further accentuated when the light shines on both of the reflecting surfaces to indicate a true level or plumb condition.

I claim as my invention:

1. In a levelling instrument, a body member having a reference surface, a pendulum pivotally supported by said body member, said pendulum being a true square, with each of the four corners being at 90° from the two adjacent corners, means for pivoting the pendulum about a center equidistant from the four corners, said square having four reflecting surfaces for providing four pairs of reflecting surfaces at the corners, a source of light, means for focusing light from said source toward said reflecting surfaces, said pendulum being weighted so as to position a pair of reflecting surfaces relative to said light focusing means to reflect light therefrom, and means responsive to the reflected light for determining equal reflection from said pair of said reflecting surfaces when said reference surface is either level or plumb, with unequal reflection indicating that the reference surface is not level or plumb.

2. In a levelling instrument, a body member having a reference surface, a chamber containing damping liquid on said body member, a pendulum pivotally supported in said chamber, said pendulum having four reflecting surfaces at 90° to each other for providing four pairs of reflecting surfaces, a source of light, means for focusing light from said source toward said reflecting surfaces, said pendulum being weighted so as to position a pair of reflecting surfaces relative to said light focusing means to reflect light therefrom, signal means, and means responsive to equal reflection of light from said pair of reflecting surfaces to actuate said signal means to indicate when said reference surface is either level or plumb, with unequal reflection of light from said pair of reflecting surfaces failing to actuate said signal means, thereby indicating that the reference surface is not level or plumb.

3. A levelling instrument in accordance with claim 1 wherein said body member has a chamber in which said pendulum is mounted.

4. A levelling instrument in accordance with claim 3 wherein said chamber has damping liquid therein surrounding said pendulum.

5. A levelling instrument in accordance with claim 4 wherein said pendulum has an air space therein so related to the weight of said pendulum that the specific gravity of said pendulum is substantially the same as that of said damping liquid to minimize friction on the pivotal support for said pendulum relative to said body member.

6. A levelling instrument in accordance with claim 1 wherein said pair of reflecting surfaces are differently colored.

7. A levelling instrument in accordance with claim 1 wherein said means to determine equal reflection comprises a pair of projection screens to receive light reflected from said pair of reflecting surfaces toward which the light source is focused.

8. A levelling instrument in accordance with claim 7 wherein said projection screens are oriented in a common direction for convenience of observation, and reflector means is provided to reflect opposite light beams from said pair of reflecting surfaces in said common direction.